United States Patent [19]

Lagno

[11] Patent Number: 5,929,531
[45] Date of Patent: Jul. 27, 1999

[54] LUNAR TIDE POWERED HYDROELECTRIC PLANT

[75] Inventor: William J. Lagno, Tacoma, Wash.

[73] Assignee: William Joseph Lagno, Maple Falls, Wash.

[21] Appl. No.: 08/858,455

[22] Filed: May 19, 1997

[51] Int. Cl.⁶ .................................................. F03B 13/12
[52] U.S. Cl. .............................. 290/53; 290/42; 417/330; 60/398
[58] Field of Search ................................ 290/42, 43, 53, 290/54; 417/330; 60/398, 506

[56] References Cited

U.S. PATENT DOCUMENTS

| | | |
|---|---|---|
| 1,098,208 | 5/1914 | Abbott . |
| 3,668,412 | 6/1972 | Vrana et al. ............................... 290/53 |
| 3,746,875 | 7/1973 | Donatelli ................................... 290/42 |
| 3,959,663 | 5/1976 | Rusby ....................................... 290/53 |
| 3,974,652 | 8/1976 | Lovmark ................................... 60/398 |
| 4,184,336 | 1/1980 | Lamberti ................................... 60/507 |
| 4,284,901 | 8/1981 | Giguere .................................... 290/53 |
| 4,305,003 | 12/1981 | Basuto et al. ............................ 290/54 |
| 4,392,060 | 7/1983 | Ivy ............................................ 290/53 |
| 4,418,286 | 11/1983 | Scott ........................................ 290/42 |
| 4,434,375 | 2/1984 | Taylor ...................................... 290/53 |
| 4,539,484 | 9/1985 | Suggs ....................................... 290/53 |
| 4,544,849 | 10/1985 | Choi ......................................... 290/53 |
| 4,599,858 | 7/1986 | La Stella et al. ........................ 60/497 |

FOREIGN PATENT DOCUMENTS

| | | |
|---|---|---|
| 2343135 | 11/1977 | France . |
| 2279113 | 12/1994 | United Kingdom . |

*Primary Examiner*—Nestor Ramirez
*Assistant Examiner*—Nicholas Ponomarenko

[57] ABSTRACT

A lunar tide powered hydroelectric plant of variable size and power generation capacity for basing on land or in tide waters. The basic collection of mechanical power is done by torsion spring bank units positioned on a concrete barge. The land-based plant obtains oscillatory motion from a notched frame. The tide water based plant obtains oscillating motion from notched piling. An individual torsion spring bank unit can comprise columns of horizontally aligned torsion springs based on a row of torsion springs of a bottom control cell. The tidal and wave motion is transferred to the torsion spring banks. A computer system manages the release of each torsion spring column to a drive shaft of a generator to produce electrical power. The computer system also permits the conversion of kinetic energy by reversing the gearing system for the upward motion of the floating barge so as to obtain a constant input of kinetic energy to the generator.

20 Claims, 11 Drawing Sheets

Fig. 13

LUNAR TIDE POWERED HYDROELECTRIC PLANT

BACKGROUND OF THE INVENTION

1. Field of the Invention

The present invention relates to lunar tide powered hydroelectric plants which are non-polluting and versatile in size range. The plants generate electricity from the kinetic energy obtained by the action of wave and tide motion and collected by torsion spring cells aggregated in banks which are coordinated by a computer to release its stored mechanical and potential energy in a controlled system to convert the stored mechanical energy to electrical power.

2. Description of the Related Art

The related art shows various water-powered devices to produce electricity. Power generation plants are known to pollute the environment because of the burning of fossil fuels. Nuclear power plants create toxic waste. Dams with water turbines block off waterways and interfere with migratory or spawning fish runs. The present invention permits a wide range in size from a land-based unit to a much larger floating plant with no environmental pollution and no disruption of the waterway. The art of interest will be discussed in the order of their perceived relevance to the present invention.

U.S. Pat. No. 4,418,286 issued on Nov. 29, 1983, to Lisbon Scott describes a wave and tidal energy driven electric generator comprising a walking beam or boom type drive arm with a float on one end and an adjustable counterbalance weight on the opposite end. The drive arm is shaped like a tuning fork with the handle pivoting on a wave energy transducer based on a float platform. The energy storage portion and the electricity generation portion are based on another platform supported by piling. By using a universal ratchet clutch on both ends of the main power shaft, the shaft is engaged when the float drops and rises. There are only three large double spring combinations wherein each doubled spring has an increasing diameter and the springs are arranged in alternating fashion in terms of diameter. The springs are geared together at both ends. The last spring with a worm gear prevents excessive torque but gives a constant RPM input. The larger diameter end of the third spring is connected to a beveled gear which drives a smaller beveled drive gear of a hydraulic torque converter. The torque converter reduces the high RPM of the drive gear to a low speed of 900 RPM and a high torque output to the generator. The system can produce 875,000 ft.-lb./min at an output of 1 megawatt/day. There is no suggestion for increasing the number of springs from the three doubled springs. The springs have eccentric diameters and are arranged in a specific manner. The present invention utilizes multiple columns of cells which are controlled by a bottom control cell, do not require a yoke and counterweight arrangement, and can vary greatly in terms of spring banks.

France Patent No. 2,343,135 issued on Sep. 30, 1977, to R. Pouges describes a wave energy converter using a float mounted between two vertical guides anchored to a sea bed. A vertical rod from the float has a side with a rack which engages a pinion gear mounted on a horizontal shaft. A ratchet drive and a cogged plate permit only rotation of the drive shaft of the generator in one direction as the float travels up and down. There is no suggestion for obtaining work energy from the float's total movement.

U.S. Pat. No. 3,959,663 issued on May 25, 1976, to Joseph V. Rusby describes a tide-powered electrical generator comprising a generator mounted float constrained between four jack bars (pilings) raised with successive incoming tides until the maximum height of at least twice the normal tidal differential, e.g., six feet, is obtained setting off an alarm. The weighted float is then allowed to descend to convert the potential energy to electrical energy by the generator. No gearing systems are shown. This reference is distinguished by failing to utilize the downward motion of the waves and the tides for generation of power.

U.S. Pat. No. 1,098,208 issued on May 26, 1914, to James R. Abbott describes a wave and tide motor system installed on a pier or wharf. A barrel float is confined between pier pilings and attached to a vertical rack along which a pinion gear traverses up and down with the wave motion. The reciprocating motion is converted to a rotary motion by positioning the pinion gear on a crankshaft containing two cranks underneath the pier. The cranks operate two reciprocating rods with underlying teeth which operate two cooperating clutch mechanisms to maintain the same rotation on a flywheel which connects a generator shaft apparently by a drive belt. The crankshaft and clutch mechanisms do not suggest the reversible gear system of the present invention.

U.S. Pat. No. 3,746,875 issued on Jul. 17, 1973, to Joseph Donatelli describes an electrical power plant driven by ocean tides and waves. The object is to obtain energy from: (1) the two-directional flow of water up and down from changes in the levels of waves and tides; and (2) the two-directional flow of ocean waves and tides towards and away from shore. A non-planar floating platform is contained by a slotted fixed piling enclosure and a sloped roof with. The floating platform is constructed to have a landward edge portion and a seaward edge portion which slope inward toward the center so as to form first and second paths of water. Paddle wheels are mounted in the paths to generate electricity to four electrical generators housed on the floating platform adjacent to the floats or air filled tanks. Another set of two generators housed on the roof accept mechanical energy from two gear posts, each having two spur gears to mesh with the double racked posts. The reference utilizes a conventional switching arrangement to sum up in phase the electricity generated from both the up and down movement of the gear post and from the floating platform. Apparently the rotational changes of the paddle wheels on each side of the floating platform are not considered, because only one-way flow of seawater from each side is used to generate electricity, whereas the rack and gear generated electricity is derived from an up and down motion. The reference is distinguished because it does not contemplate the use of reverse gearing to correct the rotational change involved with the up and down motion of seawater.

U.S. Pat. No. 4,539,484 issued on Sep. 3, 1985, to Louis F. Suggs describes a wave and tide powered generation apparatus comprising a rectangular float with a rotatable drum located at each corner. The float is confined in a frame fixed to the sea bottom. Each drum has a line wound around it. One end of the line is connected to an upper frame element and the opposite end is anchored to a projection from a leg of the frame. The drum is attached to a first clutch assembly at one end to a first drive gear which drives a first driven gear on the power shaft of an electric generator. The opposite end of the drum is attached to a second clutch assembly which further connected to a second gear assembly consisting of five idler gears to drive a second driven gear of the power shaft. A third clutch assembly, an overrunning clutch, is located between the first gear assembly and the flywheel on the power shaft to permit the free rotation when the second gear assembly is operating. The operation of the second gear assembly allows the power shaft to rotate in the opposite direction as the second drive gear. This arrangement allows the power shaft to be driven in one direction by rotation of the drum in either direction due to the rise and fall of the float or barge. This gearing arrangement is structurally different from the reverse gearing mechanism of the present invention. Moreover, the drum and frame arrangement is structurally different from the rack and pinion gear arrangement of the present invention.

U.S. Pat. No. 4,284,901 issued on Aug. 18, 1981, to A. Marcel Giguere describes an apparatus for utilizing tidal variation to generate electricity. The apparatus comprises a floating power unit which ascends and descends a fixed column mounted on the ocean floor. Three embodiments are shown. The first embodiment of FIG. 1 has a floating island on a pair of gear connected racked posts of a foundation on a sea floor. The island includes a system of five interconnected sprocket wheels for each post driving a generator. One post system operates only for rising tides while the other post system operates only for falling tides. The second embodiment of FIG. 2 provides a floating island including a chamber oscillating on a base pedestal which includes turbine systems which utilize the water flow into and out of the floating island's chamber to drive a generator. An air compressor-air motor-generator system operates to create electricity from the flow of pressurized air in the floating island's chamber and stored in an air reservoir for slack tides. FIGS. 3 and 4 show a third embodiment wherein a floating island is attached to a post on a gimbal and having a helical track. It is unclear how the floating island is attached to the post, other than surrounding a collar system which traverses the helical post and drives a generator as the floating island rotates up and down. These three embodiments are all structurally different from the present invention.

U.S. Pat. No. 4,544,849 issued on Oct. 1, 1985, to In K. Choi describes a method and apparatus for tidal electric power generation using the buoyancy energy of the tide. An intricate system of two water reservoirs operated by a 4-way valve system provides for the addition or drainage of sea water to a buoyant container confined between piling. The buoyant container (similar to a ballast tank) having a pinion gear moves up and down a fixed rack. A pair of beveled gears meshed to the pinion gear operate a moving (up and down) power transmission apparatus controlled within by manual means. The power transmission apparatus includes a pair of conic helical gears which control the 4-way valve system. This involved apparatus by virtue of the buoyant container and the attendant intricate power transmission is unlike the present invention.

U.S. Pat. No. 4,599,858 issued on Jul. 15, 1986, to Joseph P. La Stella et al. describes an ocean wave energy device and a method of using the device to obtain electricity. A rack and pinion gear apparatus has the power shaft connected to a wave frequency detector and a brake disc-caliper at one end and a D.C. generator with rectifying means on the other end. This rack and pinion apparatus is mounted between platforms supported by four pillars at each corner. The rack has a buoy on the bottom which oscillates with the wave frequency. The disc brake is manually or automatically monitored to hold or release the power shaft and consequently the buoy at predetermined intervals to increase the upward and downward oscillation. The apparatus is not utilized during slack tide and little wave action. This feature along with the matching of frequencies of the wave motion and the buoy motion is inconsistent with the present invention which accumulates electrical power with spring banks.

U.S Pat. No. 3,974,652 issued on Aug. 17, 1976, to August O. Lovmark describes a device for converting wave energy to electrical power. A pier supports a fulcrum which has four vertical arms with floats at one end at various levels and ratchet driving sprocket wheels at the opposite end to drive respective ratchet wheels mounted on one shaft on the pier. A gear box increases the drive shaft's RPM from 200 to 400 faster than the drive shaft's RPM. The drive shaft drives a pump which pressurizes a recycled fluid (oil or ocean water) to a high pressure reservoir which also receives air from a compressor. The pressurized fluid then drives a motor which drives a generator to create electricity. The fluid from the motor is recycled through a fluid reservoir to the pump. This involved additional apparatus on the pier is not required in the present invention.

U.S. Pat. No. 4,184,336 issued on Jan. 22, 1980, to John Lamberti describes a water-wave energy transducer system wherein a boat containing a transmission gear box is connected to a swing block in the boat traversing a vertical rack suspended from a frame anchored to the sea floor. The rack passes through the boat and is pivotally anchored. The swing block has beveled gearing transmitting rotary motion to the transmission gear box which contains over-running clutches and a journaled output shaft. The output shaft only rotates in one direction to drive a generator inside the boat. The size and location of this installation appears to be limited to shallow water. Moreover, there is no suggestion for substituting a spring means for storing the mechanical energy derived from wave motion.

United Kingdom Patent Application No. GB 2,279,113 A published on Dec. 21, 1994, for Bahram Momeny describes a wave power generator wherein a heart-shaped buoyant housing having a concrete or water weighted tip cylinder at the apex is counterbalanced by a larger weighted cylinder which contains the generation apparatus. The counterweight cylinder is moored to the sea bed at its ends. The housing consequently is rotated up and down by wave motion. The oscillatory motion is converted to one rotational movement which is transmitted through a system of gearing to a coiled spring or a set of dual compression springs by differential gearing to a slip clutch and generator, which elements are all inside the cylinder. The installation is small in size compared to the large installations contemplated in the present invention because the housing must rotate up to 100° with each wave motion.

None of the above inventions and patents, taken either singularly or in combination, is seen to describe the instant invention as claimed. Thus, a lunar tide powered hydroelectric plant solving the aforementioned problems is desired.

SUMMARY OF THE INVENTION

The present invention harnesses the energy involved in tidal and wave motion for conversion to electrical energy with no pollution effect, and enables the versatility of size suitable for generating electricity for a homeowner or for larger communities. The essence of the invention lies in the spring bank(s) employed. A computerized system enables the control of releasing the harnessed energy of a bank of torsion springs sequentially. The present invention can be located on land or on the water.

Accordingly, it is a principal object of the invention to provide a lunar tide powered hydroelectric plant.

It is another object of the invention to provide a lunar tide powered hydroelectric plant which can vary in size for individual homeowners to large installations.

It is a further object of the invention to provide a lunar tide powered hydroelectric plant which does not pollute the environment.

Still another object of the invention is to provide a lunar tide powered hydroelectric plant which can convert the kinetic and potential energy of wave and tidal motion to mechanical power and ultimately electrical power.

It is an object of the invention to provide improved elements and arrangements thereof in lunar tide powered hydroelectric plants for the purposes described which are dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is directed to lunar tide powered hydroelectric plants which are directed to the following three embodiments: (1) a small scale land based plant; (2) a small scale off-shore based plant; and (3) a large, heavy-duty off-shore based plant.

Figure 1:
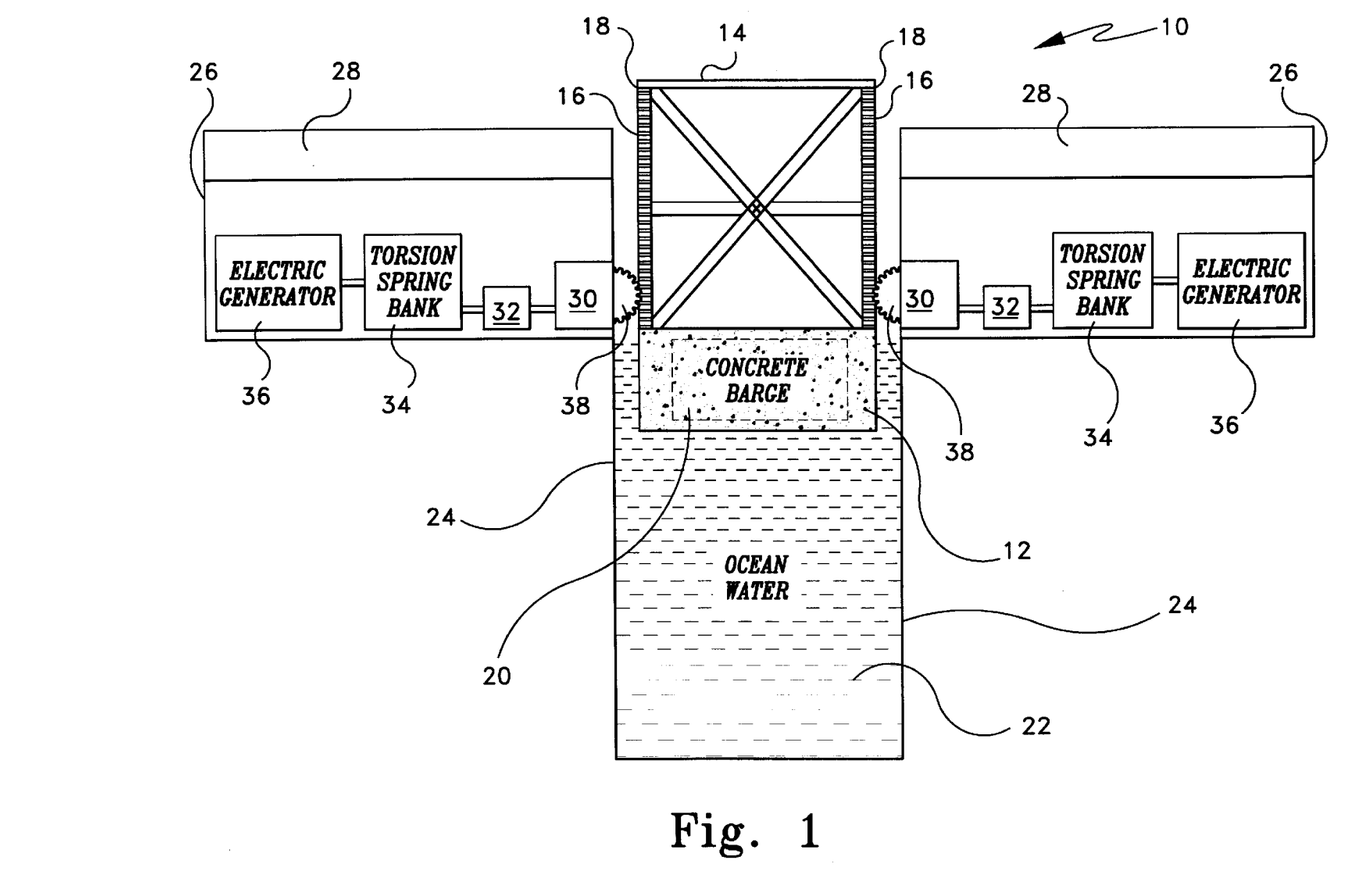
FIG. 1 is a schematic front view of a lunar tide powered hydroelectric plant based in part on land according to a first embodiment of the present invention.

FIG. 1 is directed to the first embodiment which comprises a land based hydroelectric plant 10 having a concrete barge 12 supporting a frame 14, preferably wooden, with notches 16 on one side of the vertical poles or posts 18. The barge 12 has a cavity 20 of adequate dimensions to float the barge with its frame in a limited space of ocean or brackish water 22 traversing a space between two reinforced land banks 24 or the like. Automatic bilge pumps (not shown) are installed within the cavity 20 in the event of any leakage of the concrete barge 12. On each bank 24 a housing 26 with a cover 28 is located to contain the following elements in a mechanically connected train as follows: first gear box 30, a second gear box 32, a torsion spring bank 34, and an electric generator 36. A computer (not shown) coordinates the mechanics of the torsion spring bank 34 and the generator 36. The first gear box 30 contains a partially exposed large pinion 38 which meshes with several notches 16 on the pole 18. Although FIG. 1 depicts the notches 16 as being located preferably on a front surface, it is also contemplated that the notches can be located on an outside or external edge so as to mesh head to head with the pinion 38 as in the second embodiment.

The first gear box 30 also contains a smaller diameter reduction gear (not shown) aligned with the pinion 38 to reduce the torque and increase the revolutions by a factor of approximately four. The pinion 38 and the reduction gear therefore rotate in either direction due to the rise and fall of the barge 12 with the tide and wave motions.

Figure 8A:
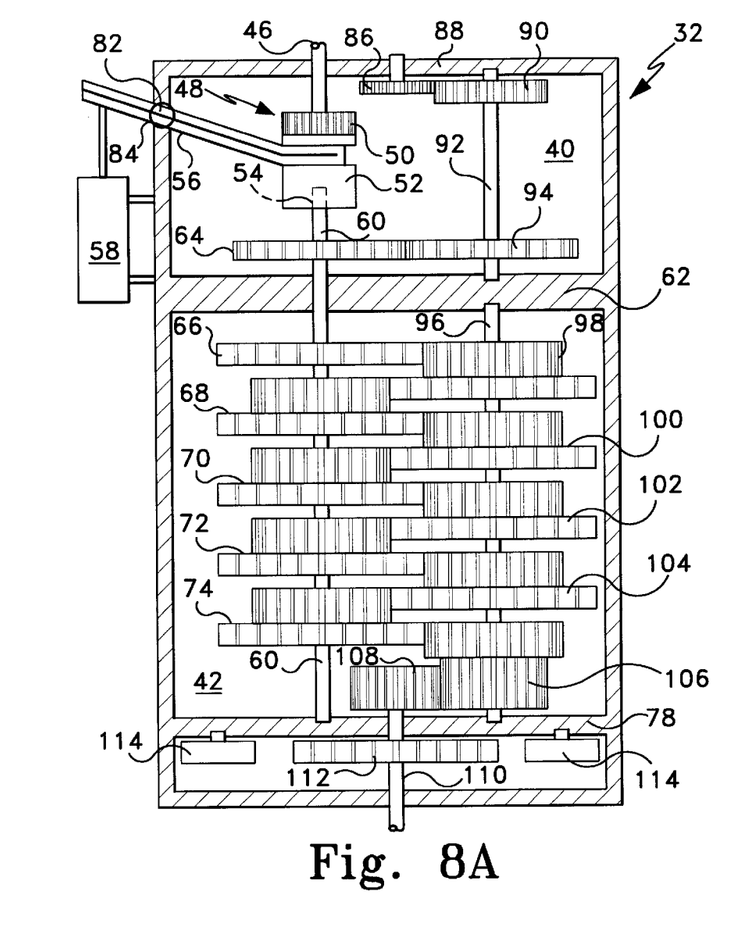
FIG. 8A is a plan view of the reversing gear box with only the frame in section.

The first gear box 30 then transfers the oscillating motion to the second or reversible gear box 32 depicted in FIGS. 8A–8D. FIG. 8A illustrates in partial section the box 32 having an upper compartment 40, a middle compartment 42 and a lower compartment 44. The upper compartment 40 contains an input shaft 46 connected to a shifting power coupler 48 having a spur gear portion 50 and a flywheel 52 disconnectable at 54. Between the spur gear portion 50 and the flywheel 52, a shifting lever 56 is coupled to the shaft 46. The shifting lever 56 in turn is manipulated by a shifting solenoid 58 operating either by pneumatic or hydraulic means controlled by a computer (not shown). The input shaft 46 rotates the flywheel 52 and a journaled shaft 60 which passes through the wall 62 between the upper compartment 40 and the middle compartment 42. The shaft 60 has a fixed spur gear 64 in the upper compartment 40 and another fixed spur gear 66 and five free-spinning transducer gears 68, 70, 72, and 74 in the middle compartment 42. The shaft 60 is journaled into the wall 78 separating the middle compartment 42 from the lower compartment 44. A single transducer (or overdrive) gear 80 is depicted schematically in FIG. 8C. The preferred gear ratio results in approximately 1:50 revolutions.

Figure 8B:
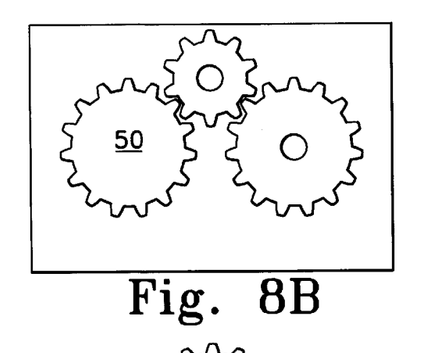
FIG. 8B is an enlarged front view of the shifting power coupling gear, the reverse idler gear and the secondary shift gear of the FIG. 8A reversing gear box.
Figure 8C:
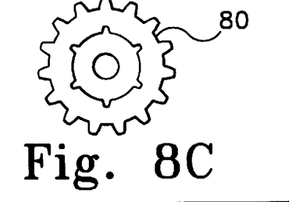
FIG. 8C is an enlarged front view of one transducer gear of the FIG. 8A reversing gear box.

FIG. 8A shows the stage wherein the shifting power coupler 48 is in the non-reversal stage. FIG. 8B illustrates the gearing relationship as the computer activates the shifting solenoid 58, the shifting lever 56 as a fulcrum rotates up due to the pivot pin 82 in the aperture 84. This action displaces the shifting power coupler 56 on the input shaft 46 from the shaft 60 to mesh the coupler spur gear 50 with the reverse idler gear 86 journaled into the outer wall 88. The idler gear 86 in turn rotates the secondary shaft gear 90 on the reversing shaft 92 in the same direction as the input shaft 46. Reversing shaft 92 is journaled at one end to wall 88 and at the opposite end to wall 62. Proximate to wall 62, a fixed spur gear 94 on shaft 92 meshes with the fixed spur gear 64 to now reverse the direction of the gears 66, 68, 70, 72, and 74.

Turning to the second gear train in the middle compartment 42, a shaft 96 journaled into wall 62 and wall 78 supports free spinning transducer (or overdrive) gears 98, 100, 102, 104, and 106 which mesh correspondingly with transducer gears 68, 70, 72, and 74. The smaller transducer gear 106 in turn meshes with a spur gear 108 on the output shaft 110. Therefore, when the input shaft rotates in a reverse direction due to the oscillating pinion 38 in the first box contacting the poles 16, the same rotational direction is maintained in the output shaft 110 running to the torsion spring bank 34.

Figure 8D:
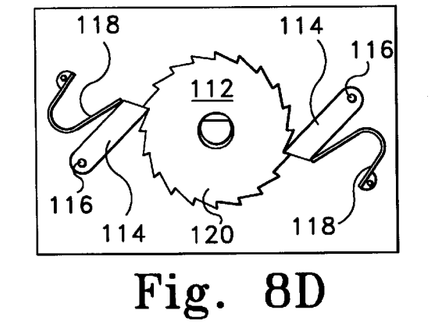
FIG. 8D is an enlarged front view of the locking ratchet gear assembly of the FIG. 8A reversing gear box.

In the third or lower compartment 44, a locking ratchet gear 112 is attached on the output shaft 110 as seen in FIG. 8D. Two locking stops 114 on pivoting pins 116 prevent the ratchet gear 112 from rotating in a reverse direction. U-shaped locking stop springs 118 permit the locking stops 114 to return to a locking position on the unidirectional gear teeth 120.

In inland waters, the waves can be 3 to 5 ft. high. In brackish waters, the tide action contributes also. In ocean water with a 6 hr. cycle, the waves can be as high as 50 ft. requiring jetties to limit the height of the waves. The slack tide lasts approximately 2 hrs. It is acknowledged that reliance on wave action alone is unpredictable due to wind conditions, but tidal action is predictable and can be relied for a steady source of power. However, the cumulative effect of wave action is additive.

Figure 2:
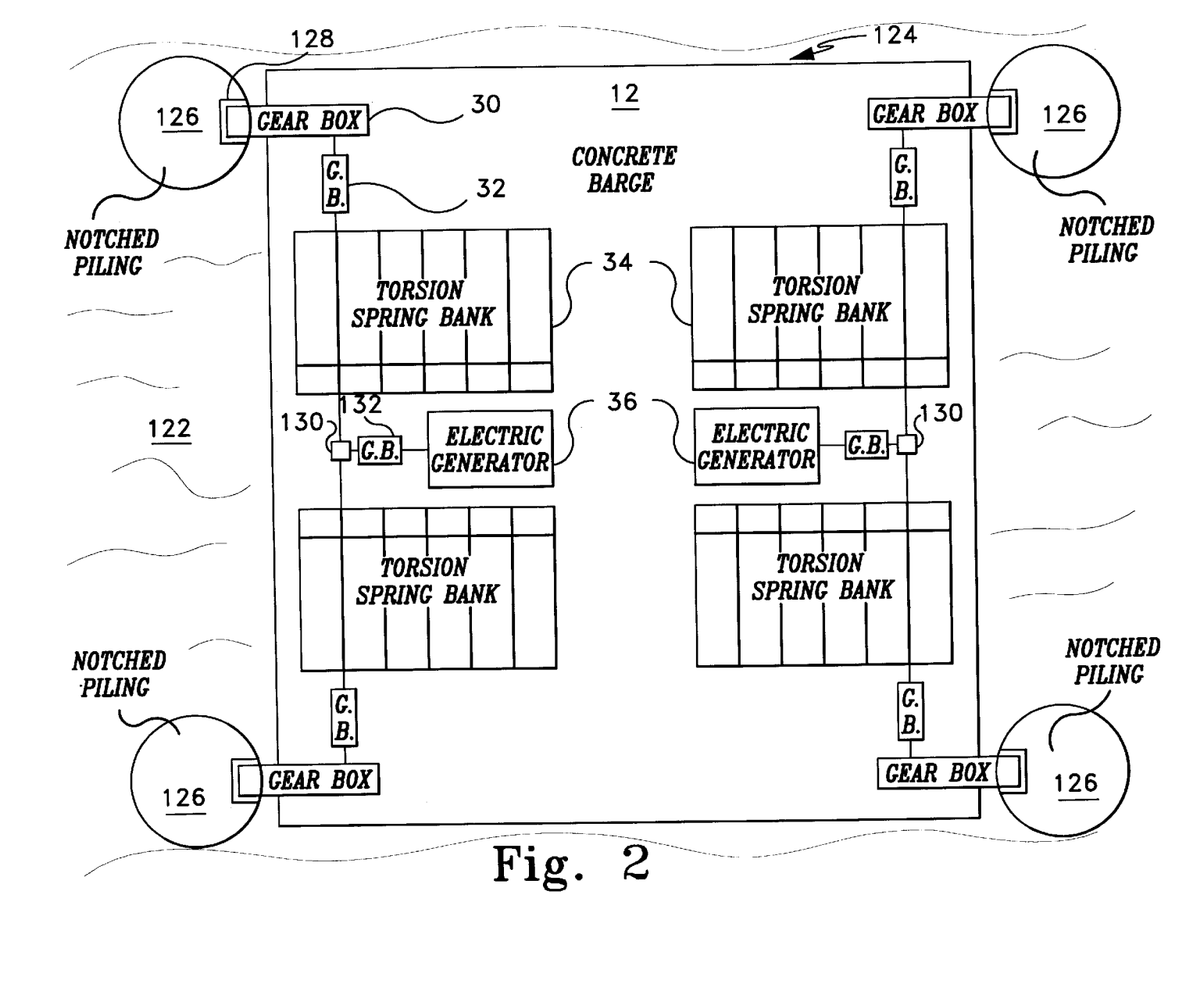
FIG. 2 is a schematic plan view of a lunar tide powered hydroelectric plant based entirely on the water according to a second embodiment of the present invention.

The second embodiment as depicted in FIG. 2 is directed to an ocean 122 based hydroelectric power plant 124. The general arrangement of the gear boxes 30 and 32 and torsion spring banks 34 are as in the first embodiment. However, the concrete barge 12 can be much larger in area to contain many torsion spring banks 34. In FIG. 2, four spring banks 34 only are depicted as exemplary. Four pilings 126 are depicted positioned proximate to the corners of the concrete barge 12. The notches 16 in a channel 128 coact with the large pinion 38 of the first gear box 30. The second gear box 32 is angled perpendicular to the first gear box due to the input shaft 46. Two torsion spring banks 34 on one side are connected by a gear box 130 shown in FIG. 9 which transmits the rotational power coming from the two torsion spring banks 34 to a reduction gear box 132 shown in FIG. 10 which reduces the amount of revolutions by a rotating shaft turning the shaft of the electric generator 36.

Figure 9:
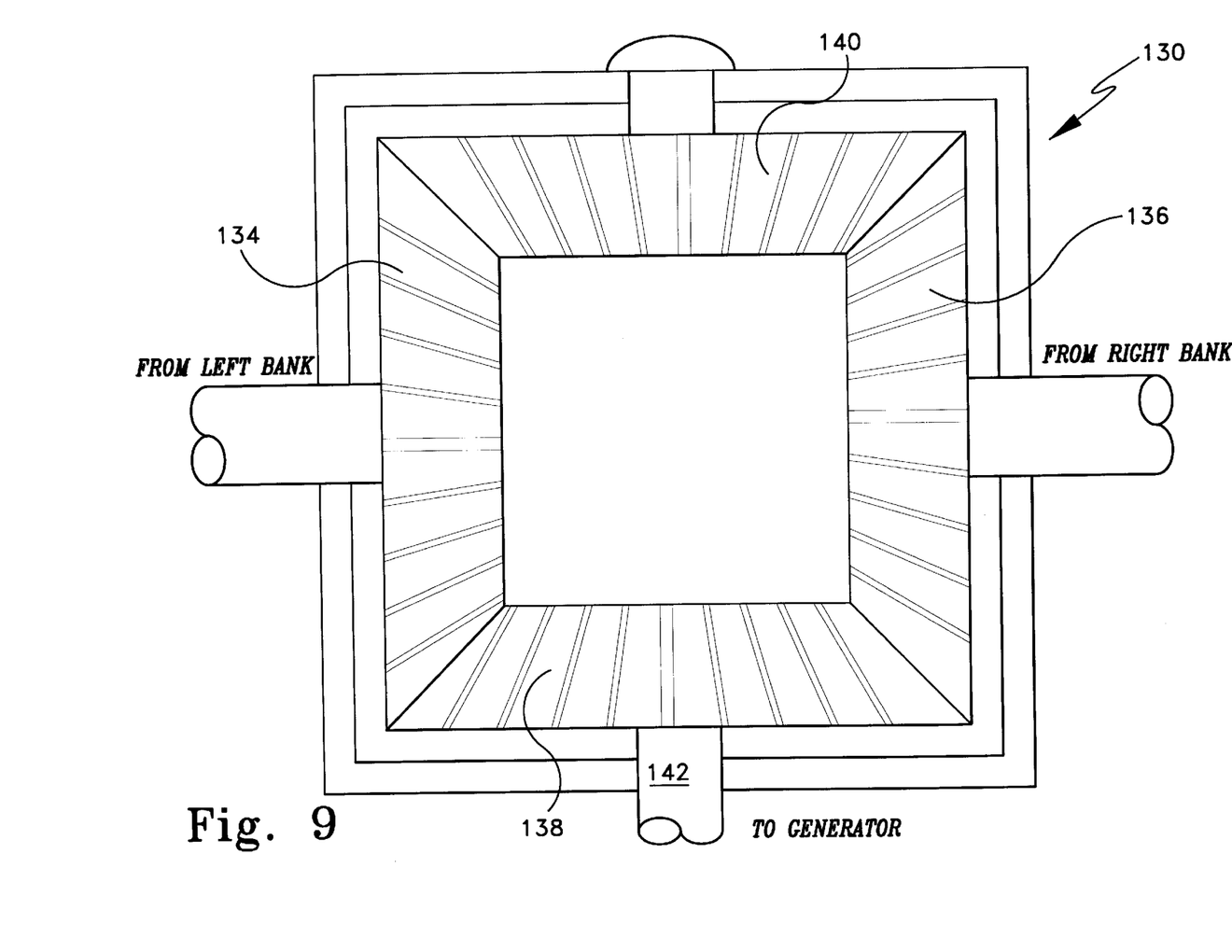
FIG. 9 is a schematic diagram of a coupling gear box in the second embodiment.

FIG. 9 shows four bevel gears 134, 136, 138, and 140. Bevel gear 134 on a drive shaft 110 coming from the torsion spring bank 34 on the left side meshes with bevel gear 140 which is a carrier gear journaled to a side of the gear box 130. The carrier gear 140 meshes with the bevel gear 136 on a drive shaft 110 coming from the torsion spring bank 34 on the right side. The output shaft 142 of the bevel gear 138 is connected to the reduction gear box 132 shown in FIG. 10 and finally to the common generator 36.

Figure 10:
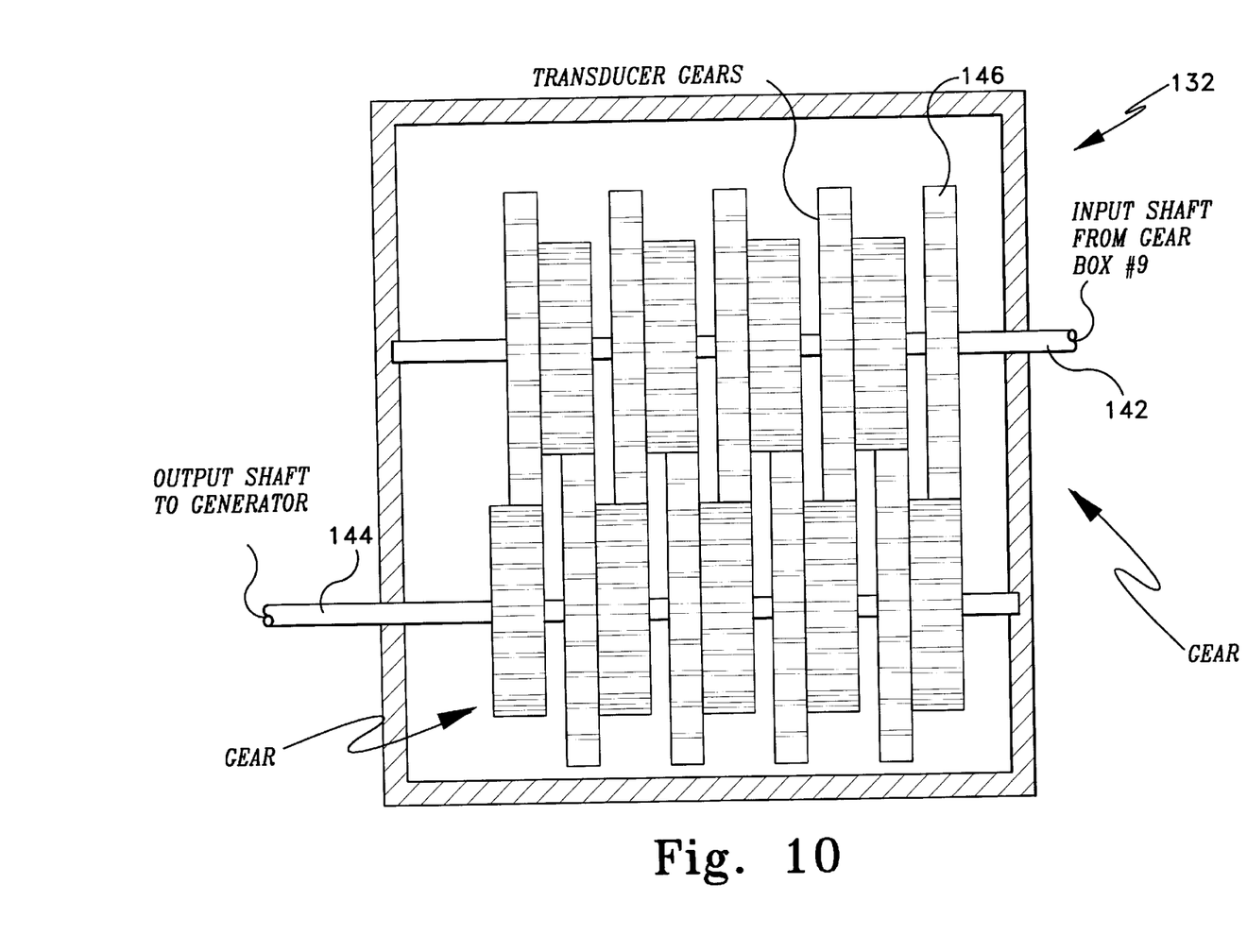
FIG. 10 is a schematic diagram of a transducer gear box in the second embodiment.

The transducer (overdrive) gearing in FIG. 10 is essentially the same configuration as was shown in the middle compartment 42 of FIG. 8A except for the last gear in the second train. Therefore, only the input shaft 142 from the gear box 130 and the output shaft 144 of the second train is noted. The first train has a fixed spur gear 66 and freely rotating transducer or overdrive gears 68, 70, 72, and 74 on the shaft 60 which is journaled into the opposite wall. The second train has freely rotating transducer gears 98, 100, 102, and 104 and a fixed spur gear 146 on the shaft 144 which drives the generator 36.

Figure 3:
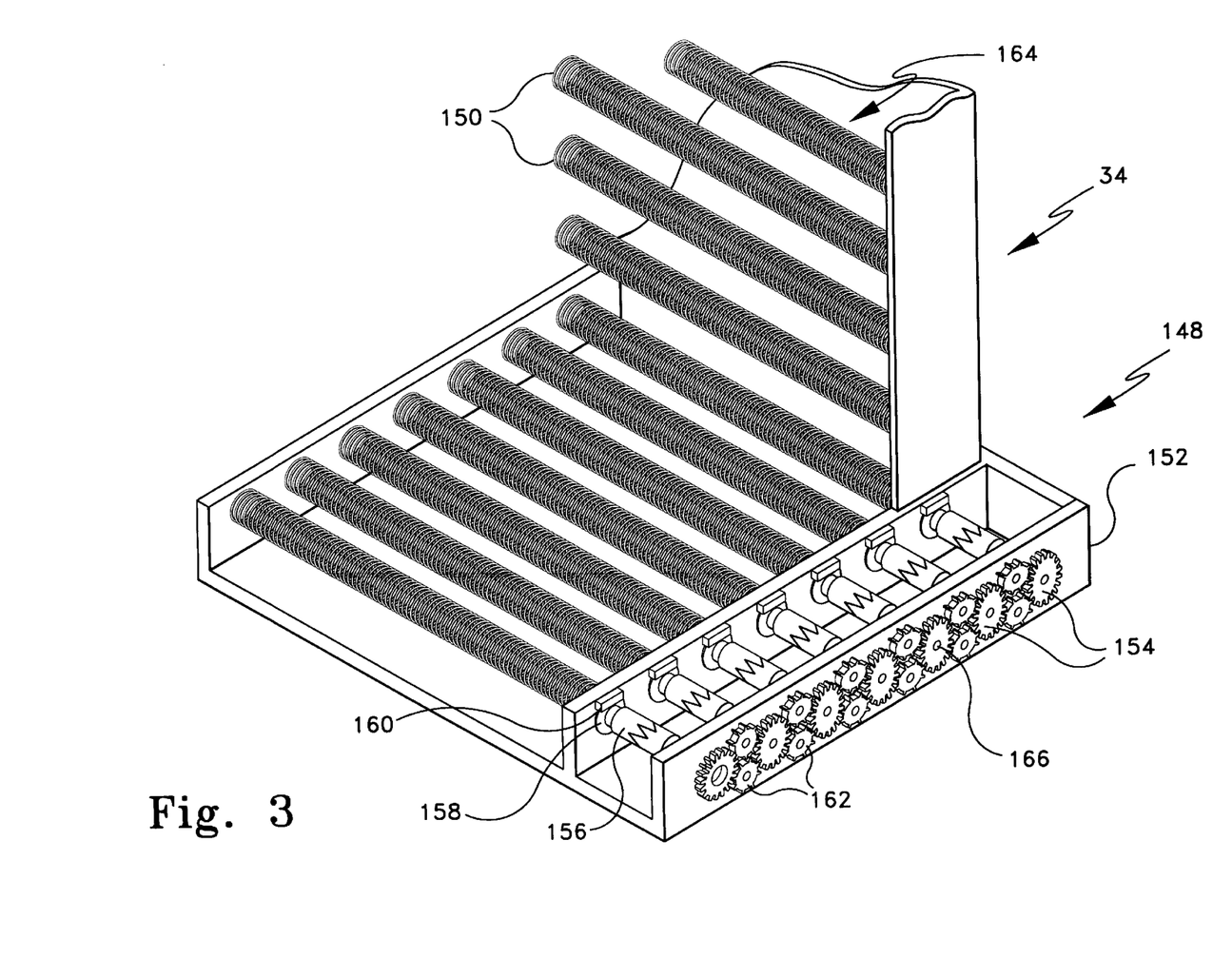
FIG. 3 is a perspective view of a cell bank showing one representative vertical storage cell of stacked springs and a control cell on the bottom.
Figure 4:
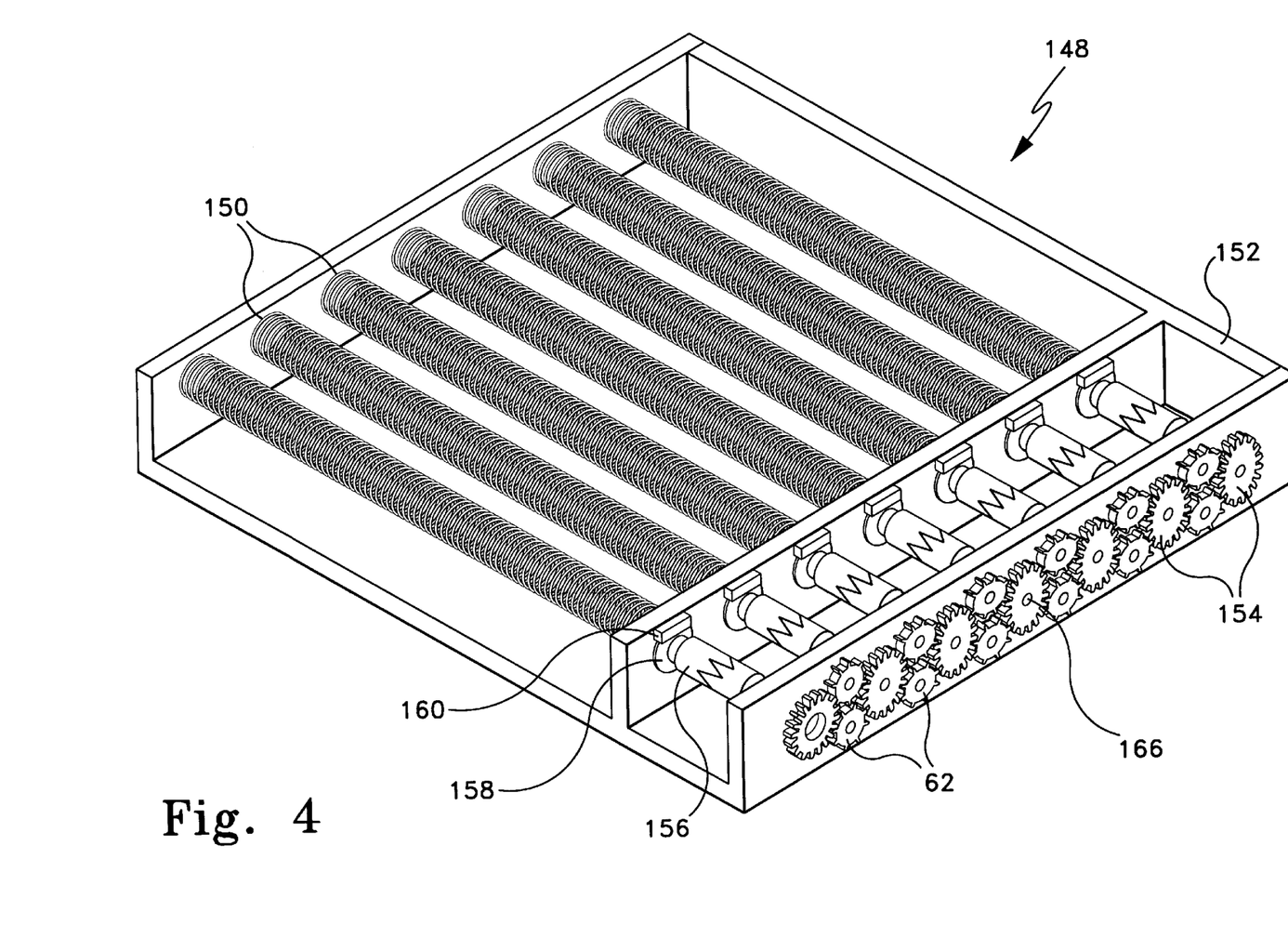
FIG. 4 is perspective view of a control cell with cutouts of one disc brake and a spring-loaded one-way gearing.
Figure 5:
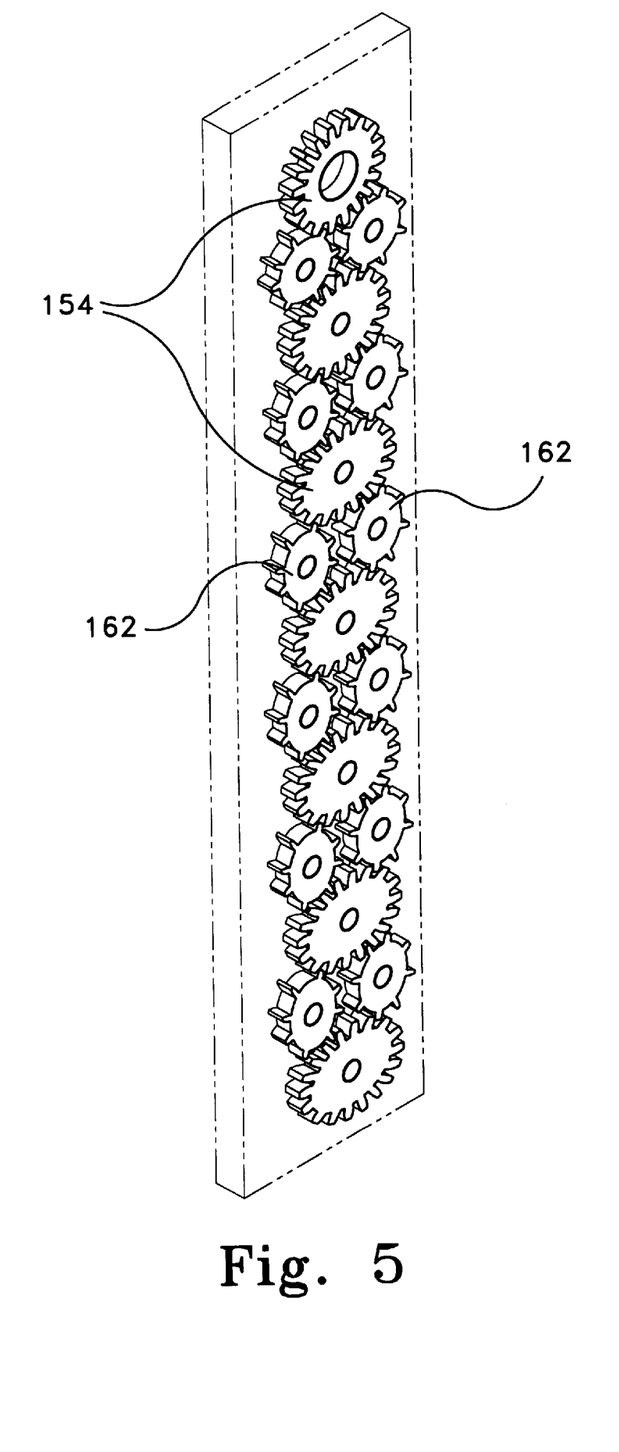
FIG. 5 is a schematic front view of the gears for a control cell.
Figure 6:
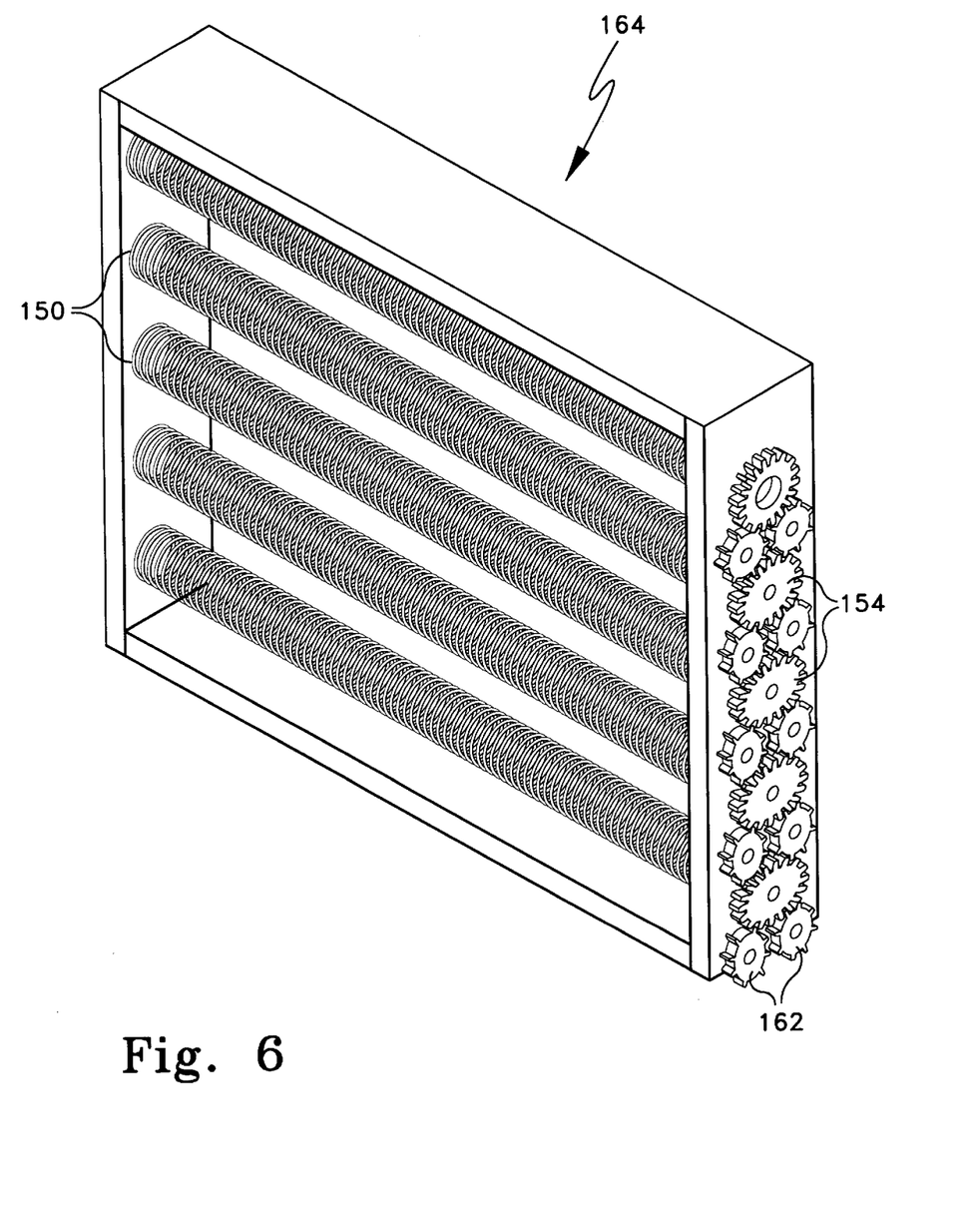
FIG. 6 is a perspective view of one storage cell with gearing shown schematically on each side.
Figure 7:
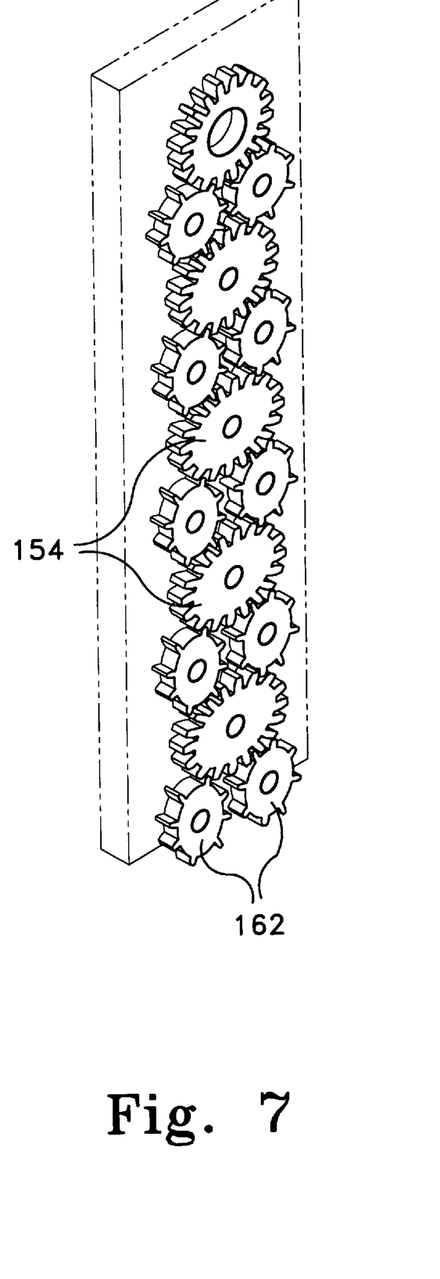
FIG. 7 is a schematic front view of a control cell.

FIGS. 3 to 7 illustrate the essence of the present invention, i.e., the torsion spring banks 34. FIG. 3 shows a torsion spring bank partially opened to reveal the horizontal control cell 148 (best seen in FIG. 4) consisting of seven torsion springs 150 in a row. Gear box 152 in the front of the spring bank 34 contain a chain of large spur gears 154 connected to each torsion spring by spring-loaded one-way gears 156 (springs not visible) and a braking system of a disc 158 and a disc brake 160. Gear boxes in the rear (not shown) lack the one-way gearing and brake system. FIG. 5 shows the arrangement of the large spur gears 154 meshing with a pair of carrier gears 162. The backup storage cells 164 have 5 torsion springs in each column (see FIG. 6). It should be noted that the bottom gears in FIG. 7 are the carrier gears 162 which mesh with the spur gear 154 in the underlying control cell 148. The columns of the backup storage cells 164 have no need for a brake system and one-way gears because the gearing system of FIG. 7 provides for the successive winding up of each torsion spring 150 until all springs in a column are fully wound. The control cell 148 thus controls the collection of mechanical energy in the backup cells by braking until sensors (not shown) connected to a central computer (not shown) indicate a full capacity for one torsion spring bank 34. Then the computer is programmed to release the disc brakes 160 in a regulated manner.

The input hookup (not shown) with the output shaft 144 (FIG. 10) can be on any of the torsion springs 150 in the control cell 148, but it is preferred to hook up with the central torsion spring in the row of seven springs. At the output end of the torsion spring control cell 148 the power takeoff shaft 166 is again preferably attached to the center torsion spring 150.

It is contemplated that the FIG. 4 control cell 148 can be utilized per se without any other columns of backup storage cells. It should be understood that all the journaled shafts in the present invention are rotating in ball bearings or the like in the walls.

Figure 11:
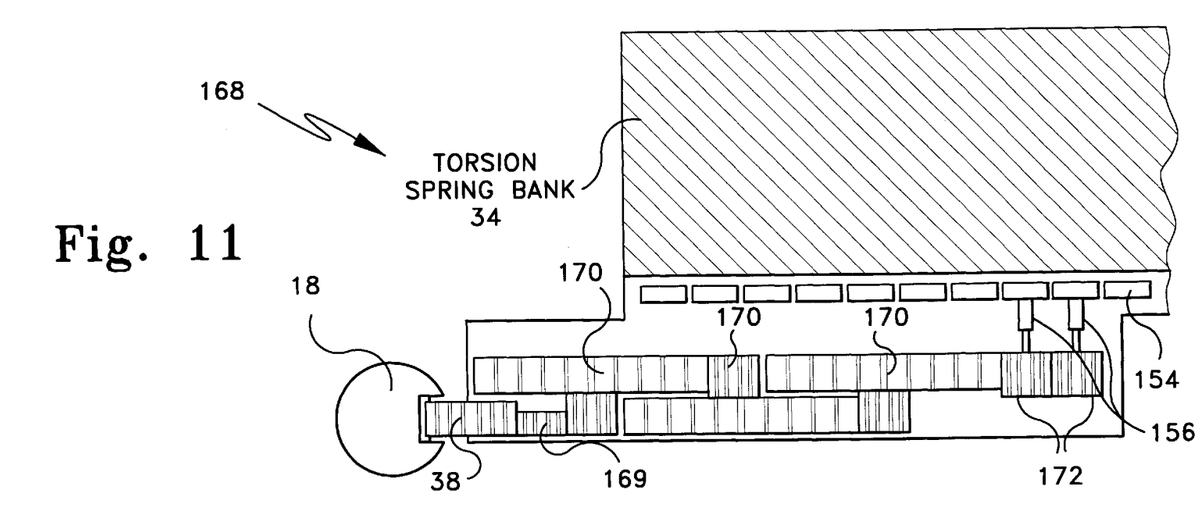
FIG. 11 is a schematic plan view of a third embodiment for a heavy duty hydroelectric plant showing the comprehensive gearing between a larger torsion spring bank and a racked piling.
Figure 12:
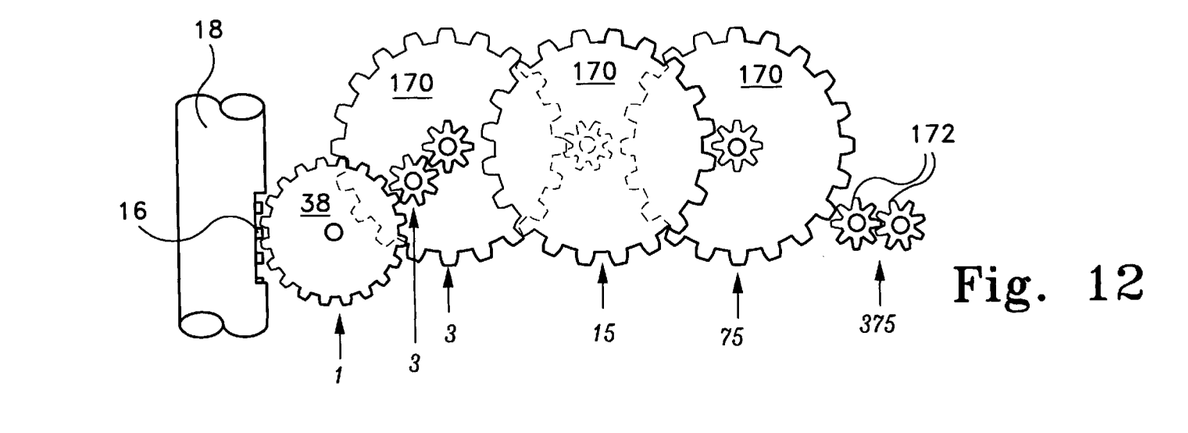
FIG. 12 is schematic front view of the FIG. 11 embodiment showing the comprehensive gearing from the rack directly to a torsion spring bank.
Figure 13:
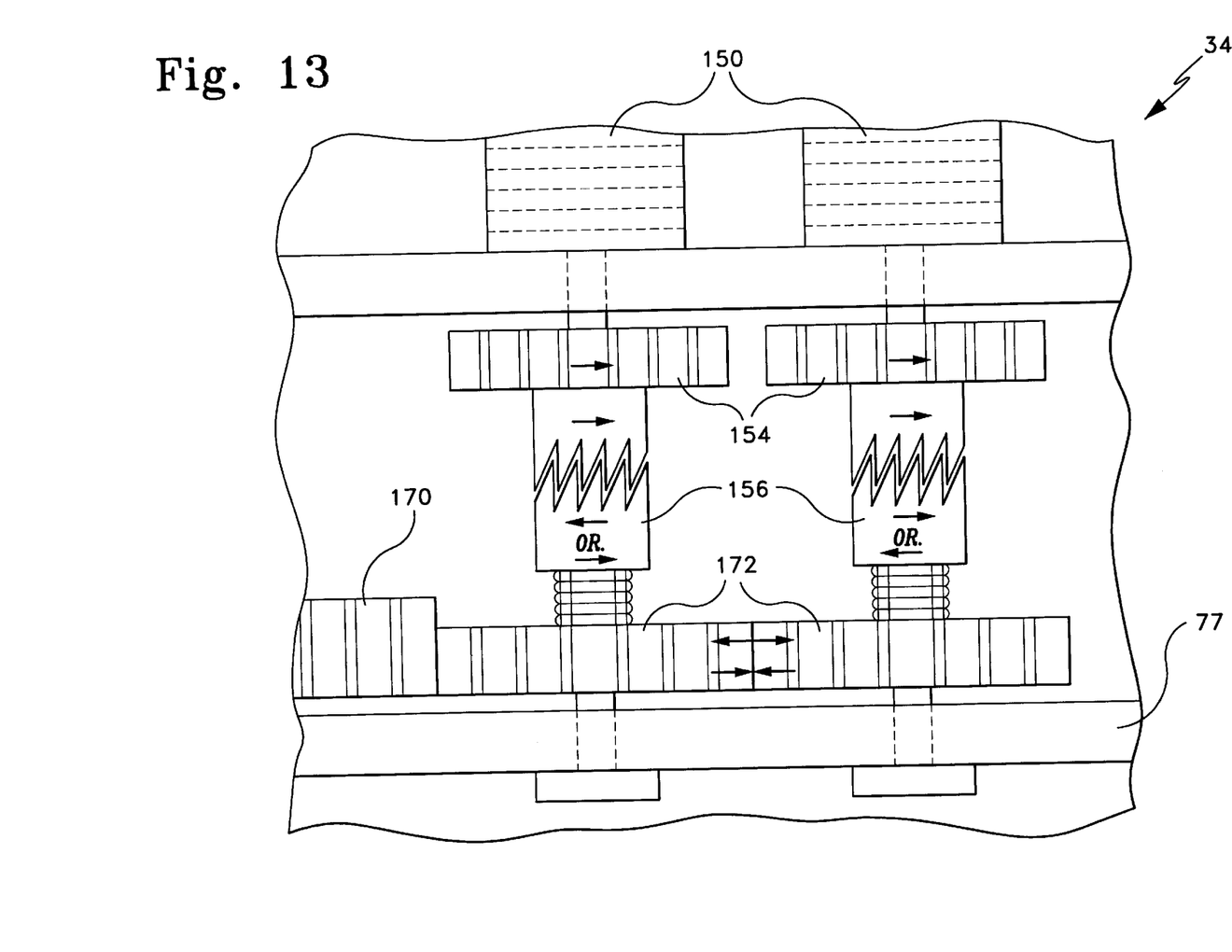
FIG. 13 is a partial enlarged schematic plan view of the FIG. 11 embodiment showing the spring-loaded one-way directional gearing and torsioning of the cell springs from the oscillating motion of the pinion on the rack.

FIGS. 11 to 13 illustrate the third embodiment drawn to a heavy-duty offshore hydroelectric plant 168 (shown partially) with modification of the first and second gearboxes. FIG. 11 depicts the incorporation of the rear gearing in the rear gear box 77 of the torsion spring bank with only two spring-loaded one-way gears 156 operating off the spur gears 154 at the rear of the torsion spring bank 34. The purpose of eliminating non-essential gearing and combining the pinion system with the torsion spring bank was intended to improve the durability of this comprehensive system. The pinion 38 meshes with a reduction gear 169 which in turn meshes with the smaller gear portion of the first of three in-line transducer gears 170 (see FIG. 12). The last transducer gear meshes with a pair of connecting loading gears 172 which rotate in opposite directions as best seen in FIG. 13. The spring-loaded one-way gears 156 journaled into the wall of the housing 77 then transmit the oscillatory motion of the pinion 38 only in one direction to the other spur gears 154 and the associated carrier gears (not shown) to apply torsion to the springs 150.

FIG. 12 illustrates the mechanical advantage employed by this comprehensive gear system by showing the number of revolutions gained with a beginning single revolution of the pinion 38 increasing geometrically to 375 revolutions of the loading gears 172. Thus, a more rugged heavy duty gear train has been shown.

It is to be understood that the present invention is not limited to the embodiments described above, but encompasses any and all embodiments within the scope of the following claims.

I claim:

1. A lunar tide powered hydroelectric plant comprising:
   a rectangular concrete barge having an enclosed flotation chamber;
   at least two vertical rack means;
   a first gear means including a partially exposed large pinion for engaging each of the at least two vertical rack means and a reduction gear meshing with the large pinion;
   a second reversible gear means for engaging each reduction gear;
   one framed torsion spring bank connected to each reversible gear means and containing a series of cooperating torsion springs with connecting gear means at each end of each torsion spring adapted to store mechanical power and to transmit said mechanical power;
   at least one electric generator adapted to convert said stored mechanical power to electrical power; and
   a computer system for controlling the release of the stored mechanical power of the torsion spring banks; whereby a lunar driven tide by moving the buoyant concrete barge up and down rotates the large pinion on the vertical rack means and the reduction gear, rotates the reversible gear means, charging the torsion spring banks during both the up and down motions, and releasing the stored mechanical energy of the torsion spring banks by automatic computer control to the generator to convert the stored mechanical energy to electrical energy.

2. The lunar tide powered hydroelectric plant according to claim 1, wherein each torsion spring bank has a series of torsion springs arranged in rows and columns.

3. The lunar tide powered hydroelectric plant according to claim 1, wherein each torsion spring bank includes at the ends of each torsion spring, a large driving spur gear which coact with two small carrier spur gears connecting adjacent driving spur gears, whereby the large driving spur gears act in concert to increase the torsion of each torsion spring in the series.

4. The lunar tide powered hydroelectric plant according to claim 1, wherein the control of the torsion springs by the computer system in a bank includes a disc brake with a sensor positioned on each disc at one end of a torsion spring; whereby when the sensor senses a maximum potential torque in a torsion spring, the disc brake is released, and when the torsion spring has completely expended its potential energy, the disc brake is applied for further collection of potential energy.

5. The lunar tide powered hydroelectric plant according to claim 4, wherein each torsion spring in a bank has a spring-loaded one-way gear connected at one end to the large driving spur gears having the disc brakes.

6. The lunar tide powered hydroelectric plant according to claim 5, wherein the reversible gear means drives a central torsion spring of the torsion spring bank.

7. The lunar tide powered hydroelectric plant according to claim 6, wherein the reversible gear means comprises an input shaft, a shifting power coupler, shifting lever means, a reverse idler gear, and a parallel series of intermeshing transducer gears; whereby the shifting power coupler when energized by the shifting lever means uncouples the input shaft and couples the reverse idler gear.

8. The lunar tide powered hydroelectric plant according to claim 7, wherein the transducer gears are free spinning on paired shafts.

9. The lunar tide powered hydroelectric plant according to claim 7, wherein the shifting lever means comprises a shifting solenoid actuated by power means selected from pneumatic and hydraulic.

10. The lunar tide powered hydroelectric plant according to claim 1, wherein each torsion spring bank has the driving spur gear at one end of the bank connected to a power take-off which drives the generator.

11. The lunar tide powered hydroelectric plant according to claim 1, based on land wherein:
    the rectangular concrete barge has a predetermined length and width;
    said at least two vertical rack means comprising a vertically disposed rectangular frame having said predetermined width with notched teeth on its external vertical sides and mounted on said barge; and
    said first gear means, said second reversible gear means, said framed torsion spring banks, said electric generators, and said computer system being located in one housing on land; whereby a land based lunar tide powered hydroelectric plant can convert the mechanical energy obtained by wave motion and tidal change to electrical energy.

12. The lunar tide powered hydroelectric plant according to claim 1, wherein the plant has at least four framed torsion spring banks arranged in an array on the rectangular concrete barge with each partially exposed large pinion engaging each of at least four vertical rack means consisting of cylindrical piling poles surrounding said rectangular shaped concrete barge proximate to its corners.

13. The lunar tide powered hydroelectric plant according to claim 12, wherein the cylindrical piling poles are filled with concrete and sand and anchored to the ocean floor.

14. The lunar tide powered hydroelectric plant according to claim 12, wherein adjacent torsion spring banks on one side of the barge share a generator.

15. The lunar tide powered hydroelectric plant according to claim 1, wherein the concrete barge contains automatic bilge pumps inside the flotation chamber.

16. A heavy duty lunar tide powered offshore hydroelectric plant comprising:
    a rectangular concrete barge having an enclosed flotation chamber with multiple automatic bilge pumps;
    a plurality of pilings with rack means;
    a housing including:
       an exposed pinion for meshing with the rack means;
       a heavy duty train of three fixed transducer gears connected to said pinion;
       two interconnected loading gears with one-way drive gears connected to said train; and
       a torsion spring bank with torsion springs in rows and columns mechanically connected to each of said two loading gears;
    an electric generator; and
    a computer system for controlling the storing and release of mechanical energy by the torsion spring bank; whereby the heavy duty gear train transmits the oscillating mechanical motion of the pinion directly to the one-way gears and to torsion springs in the torsion spring bank, and electrical energy is generated by the control of the computer system to release the distortion of the torsion springs to drive the electric generator.

17. The lunar tide powered hydroelectric plant according to claim 16, wherein the pair of interconnected loading gears are positioned in an intermediate position of a bottom row of control cells supporting columns of backup storage cells.

18. A torsion spring bank for a lunar tide powered hydro-electric plant comprising:

a series of at least seven aligned torsion springs in a frame;

an input drive connection means connected to the center torsion spring of said series;

a disc with brake means connected at one end of each torsion spring;

a one-way spring-loaded gear connected to each disc;

a large driving spur gear attached at each end of each torsion spring;

two small carrier gears of equal size adapted to mesh with adjacent large driving spur gears; and a power takeoff to a generator from an end torsion spring; whereby twisting of each torsion spring stores mechanical energy which is released to the generator by releasing the brake means on each torsion spring.

19. The torsion spring bank according to claim 18, wherein said series of at least seven aligned torsion springs comprises a control cell row for at least seven columns of back up storage cells.

20. The torsion spring bank according to claim 19, wherein each said back up storage cell column consisting of five torsion springs.

* * * * *